United States Patent
Jiron et al.

(10) Patent No.: US 10,841,419 B1
(45) Date of Patent: *Nov. 17, 2020

(54) CUSTOMER SELF-HELP CONTROL SYSTEM FOR CONTACT CENTERS

(71) Applicant: Wells Fargo Bank, N.A., San Francisco, CA (US)

(72) Inventors: Julio Jiron, San Bruno, CA (US); Kevin King, Concord, CA (US); Beth S. Moss, Danville, CA (US); James Lyle Schafer, San Francisco, CA (US); Kalyan Subramanian, Scottsdale, AZ (US); Chris Theodore Kalaboukis, San Jose, CA (US); Raziq Yaqub, Stewartsville, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,847

(22) Filed: Dec. 20, 2019

Related U.S. Application Data

(63) Continuation of application No. 16/418,692, filed on May 21, 2019, which is a continuation of application
(Continued)

(51) Int. Cl.
*H04M 3/42* (2006.01)
*H04M 3/22* (2006.01)
*H04L 29/06* (2006.01)

(52) U.S. Cl.
CPC ........ *H04M 3/42161* (2013.01); *H04L 63/10* (2013.01); *H04M 3/2218* (2013.01); *H04M 3/2281* (2013.01)

(58) Field of Classification Search
CPC .......... H04M 3/42161; H04M 3/2218; H04M 3/2281; H04L 63/10; G06F 21/6245
See application file for complete search history.

(56) References Cited

U.S. PATENT DOCUMENTS 6,904,143 B1 6/2005 Peterson et al.
8,145,562 B2 3/2012 Wasserblat et al.
(Continued)

FOREIGN PATENT DOCUMENTS

WO 2016025943 A1 2/2016

OTHER PUBLICATIONS

Response to Office Action dated Oct. 18, 2019 from U.S. Appl. No. 16/418,692, filed Jan. 15, 2020, 3 pp.
(Continued)

*Primary Examiner* — Nafiz E Hoque
(74) *Attorney, Agent, or Firm* — Shumaker & Sieffert, P.A.

(57) ABSTRACT

A computer system is described that is configured to enable customers of an organization to self-monitor account activity and modify account access settings via a contact center of the organization. The contact center control system is configured to provide an interactive call history associated with the customer's accounts with the organization. Using the call history, the customer may perform self-monitoring of calls into the contact center that access the customer's accounts, and notify the organization if any of the calls appear suspicious. The contact center control system is configured provide a user interface through which the customer may modify account access settings including changing which types of authentication methods are enabled to access the customer's accounts, and blocking account access by callers from certain phone numbers. The contact center
(Continued)

control system may allow the customer to turn off all access to the customer's accounts via the contact center.

20 Claims, 6 Drawing Sheets

Related U.S. Application Data

No. 16/000,453, filed on Jun. 5, 2018, now Pat. No. 10,313,511.

(56) References Cited

U.S. PATENT DOCUMENTS

| | | | |
|---|---|---|---|
| 8,160,941 B1* | 4/2012 | Field | G06Q 10/10 |
| | | | 705/30 |
| 8,347,364 B2* | 1/2013 | Babi | G06Q 10/06 |
| | | | 726/4 |
| 8,504,456 B2 | 8/2013 | Griffin et al. | |
| 9,001,977 B1* | 4/2015 | Ramalingam | H04M 3/385 |
| | | | 379/142.05 |
| 9,288,320 B2 | 3/2016 | Springer | |
| 9,503,571 B2* | 11/2016 | Guerra | G06Q 50/01 |
| 9,509,819 B2 | 11/2016 | Wildeman et al. | |
| 9,532,209 B2* | 12/2016 | Aleksin | G06Q 30/016 |
| 9,565,296 B2* | 2/2017 | Filonov | H04L 9/0819 |
| 9,680,995 B2 | 6/2017 | Tendick et al. | |
| 10,313,511 B1 | 6/2019 | Jiron et al. | |
| 2001/0043697 A1 | 11/2001 | Cox et al. | |
| 2003/0112928 A1 | 6/2003 | Brown et al. | |
| 2004/0208304 A1* | 10/2004 | Miller | H04M 1/663 |
| | | | 379/210.02 |
| 2006/0285665 A1* | 12/2006 | Wasserblat | G10L 17/26 |
| | | | 379/114.14 |
| 2011/0206198 A1 | 8/2011 | Feedman et al. | |
| 2015/0036813 A1* | 2/2015 | Ananthakrishnan | |
| | | | H04M 7/0027 |
| | | | 379/265.09 |
| 2015/0087265 A1* | 3/2015 | Disraeli | H04W 12/06 |
| | | | 455/411 |
| 2015/0326714 A1* | 11/2015 | Roncoroni | H04M 3/42059 |
| | | | 379/142.06 |
| 2017/0017908 A1 | 1/2017 | Bracher et al. | |
| 2017/0091780 A1* | 3/2017 | Kannan | G06N 5/022 |
| 2017/0104874 A1 | 4/2017 | Yi et al. | |
| 2017/0133017 A1 | 5/2017 | Rajakumar et al. | |
| 2018/0316687 A1* | 11/2018 | Hribovsek | H04L 63/0807 |

OTHER PUBLICATIONS

Notice of Allowance from U.S. Appl. No. 16/418,692, dated Jan. 28, 2020, 5 pp.

Lariviere, "Learning customer personalities to better manage call centers," The Operations Room, accessed from https://operationsoom.wordpress.com/2010/12/08/learning-customer-personalities-to-better-manage-call-centers/, Dec. 8, 2010, 3 pp.

"Agile CRM Call Center Software," Agile CRM, accessed from https://www.agilecrm.com/call-center-crm on Sep. 27, 2017, 6 pp.

"Protect Against Call Center Fraud," Pindrop, accessed from https://www.pindrop.com/solutions/anti-fraud/ on Sep. 28, 2017, 12 pp.

"Protecting Your Call Centers Against Phone Fraud & Social Engineering," Pindrop Security, retrieve from https://www.pindrop.com/wp-content/uploads/2016/01/ pindrop_overview_whitepaper_fi_20141121_v2.pdf on Sep. 27, 2017, 14 pp.

U.S. Appl. No. 15/905,318, filed Feb. 26, 2018, naming inventors Jiron et al.

Prosecution History from U.S. Appl. No. 16/000,453, dated Jan. 17, 2019 through Apr. 25, 2019, 19 pp.

Prosecution History from U.S. Appl. No. 16/418,692, dated Oct. 18, 2019 through Jan. 28, 2020, 19 pp.

* cited by examiner

CUSTOMER SELF-HELP CONTROL SYSTEM FOR CONTACT CENTERS

This application is a continuation of U.S. application Ser. No. 16/418,692, filed May 21, 2019, which is a continuation of U.S. application Ser. No. 16/000,453, filed Jun. 5, 2018 (now U.S. Pat. No. 10,313,511), the entire content of each of which is incorporated herein by reference.

TECHNICAL FIELD

The disclosure relates to computer systems, and more specifically, user-based controls of computer systems.

BACKGROUND

A contact center is a facility configured to handle incoming voice calls from customers or potential customers of a business or organization. One function of the contact center is to handle customer service inquiries focused on customer accounts with the organization, i.e., servicing existing accounts and opening new accounts. Although many customer service inquiries can be handled through online interactions (e.g., via websites, email, or mobile applications), for some organization, a contact center may be regarded as necessary. Customers of banks, for example, may prefer to speak to a live person when resolving service issues. A contact center may include one or more interactive voice response (IVR) systems and one or more agent desktop systems used by a number of human agents that are representatives of the business. The IVR systems and agent desktop systems may be considered front-end systems of the contact center with which the customers directly interact to resolve their service inquiries. In addition to the front-end systems, the contact center may also include or interact with multiple back-end systems to access information about the organization or about existing customers of the organization in order to properly service a customer's voice call.

SUMMARY

In general, this disclosure describes a computer system configured to enable customers of an organization to self-monitor account activity and modify account access settings for a contact center of the organization. The contact center control system is configured to provide an interactive call history associated with the customer and the customer's accounts with the organization. Using the call history, the customer may perform self-monitoring of calls into the contact center that access the customer's accounts, and notify the organization if any of the calls appear suspicious or are unfamiliar. In addition, the contact center control system is configured to provide a user interface through which the customer may modify account access settings including changing which types of authentication methods are enabled to access the customer's account, and blocking account access by callers from certain phone numbers. In some cases, the contact center control system may allow the customer to turn off all access to one or more of the customer's accounts via the contact center.

In one example, the techniques of this disclosure are directed to a computer-implemented method comprising: generating, by a computing system, a call history for a customer of an organization, wherein the call history includes one or more calls into a contact center of the organization that are associated with an account of the customer at the organization; sending, by the computing system, data representative of the call history to a user device of the customer; receiving, by the computing system and from the user device in response to the data representative of the call history, data representative of changes to account access settings that define restrictions on accessing the account of the customer via the contact center; and providing, by the computing system and to one or more front-end systems within the contact center, the account access settings for the account of the customer for use in determining whether to allow subsequent calls into the contact center to access the account of the customer.

In another example, the techniques of this disclosure are direct to a computing system comprising one or more storage units configured to store a plurality of account access settings for a contact center of an organization, and one or more processors in communication with the storage units. The one or more processors are configured to: generate a call history for a customer of the organization, wherein the call history includes one or more calls into the contact center of the organization that are associated with an account of the customer at the organization; send data representative of the call history to a user device of the customer; receive, from the user device in response to the data representative of the call history, data representative of changes to account access settings that define restrictions on accessing the account of the customer via the contact center; and provide, to one or more front-end systems within the contact center, the account access settings for the account of the customer for use in determining whether to allow subsequent calls into the contact center to access the account of the customer.

In a further example, the techniques of this disclosure are directed to a non-transitory computer readable medium including instructions that when executed cause one or more processors to: generate, by a computing system, a call history for a customer of an organization, wherein the call history includes one or more calls into a contact center of the organization that are associated with an account of the customer at the organization; send, by the computing system, data representative of the call history to a user device of the customer; receive, by the computing system and from the user device in response to the data representative of the call history, data representative of changes to account access settings that define restrictions on accessing the account of the customer via the contact center; and provide, by the computing system and to one or more front-end systems within the contact center, the account access settings for the account of the customer for use in determining whether to allow subsequent calls into the contact center to access the account of the customer.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
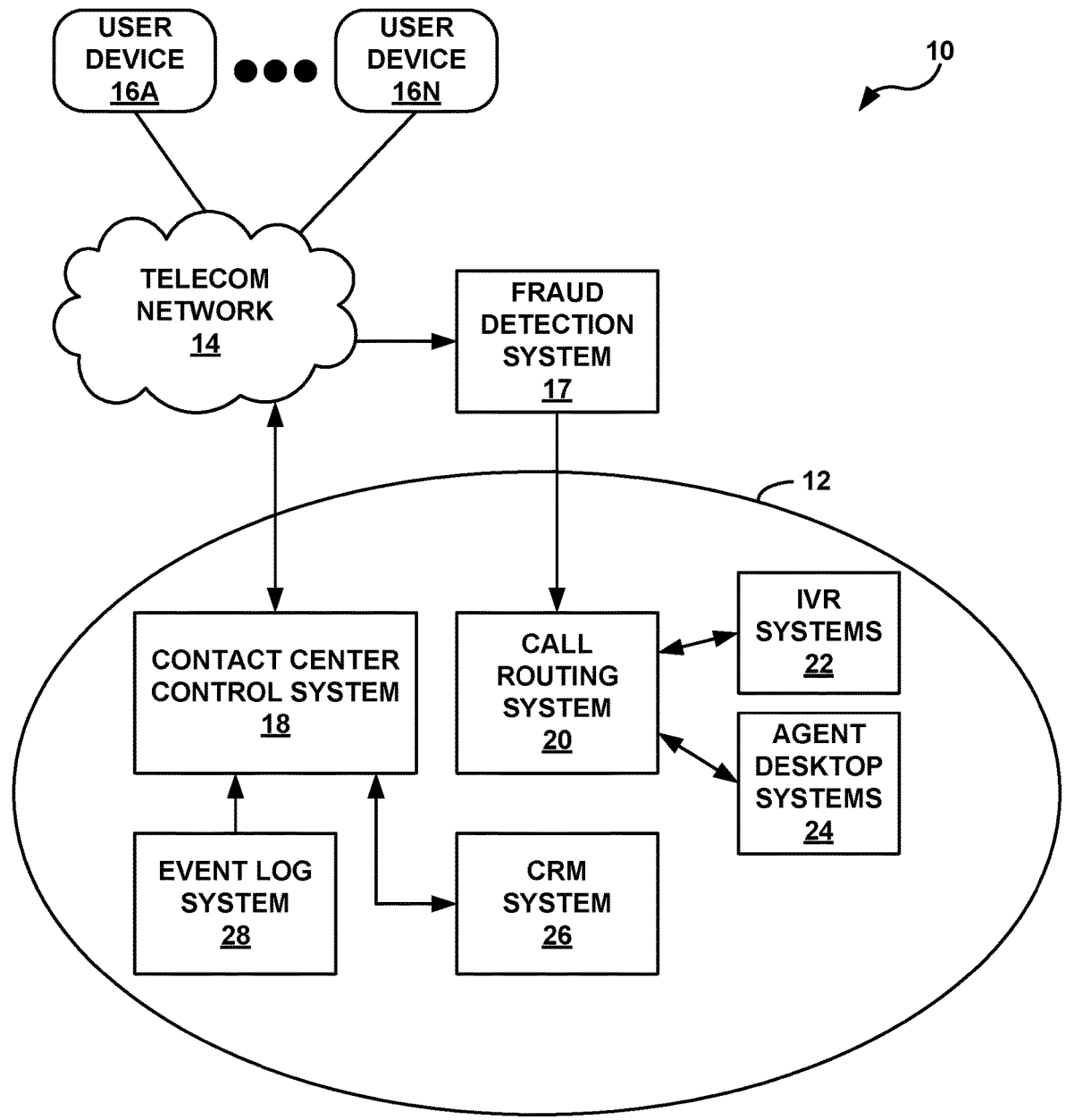
FIG. 1 is a block diagram illustrating an example contact center that includes a contact center control system configured to enable customers to modify account access settings for the contact center, in accordance with the techniques of this disclosure.

FIG. 1 is a block diagram illustrating an example contact center 12 within a network 10 that includes a contact center control system 18 configured to enable customers to modify account access settings for contact center 12, in accordance with the techniques of this disclosure. As illustrated in FIG. 1, network 10 includes one or more user devices 16A-16N (collectively "user devices 16") in communication with contact center 12 via a telecommunications network 14.

Contact center 12 is a facility configured to handle incoming voice calls from user devices 16 operated by users that may be customers or non-customers of a business or organization. In some cases, contact center 12 may be referred to as a call center. Contact center 12 includes several disparate computing systems configured to handle customer service inquiries focused on customer accounts with the organization, i.e., servicing existing accounts and opening new accounts. In some examples described in this disclosure, contact center 12 may be a contact center of a bank or other financial institution. Contact center 12 may be especially useful for those customers that prefer to speak to a live person when resolving service issues or that feel more comfortable sharing personal information over a voice channel than an online channel (e.g., website, email, or mobile application). Contact center 12 may also provide certain services that may not be available via online channels, such as opening new accounts with the organization.

User devices 16 may be any suitable communication or computing device, such as a conventional or landline phone, or a mobile, non-mobile, wearable, and/or non-wearable computing device capable of communicating over telecom network 14. One or more of user devices 16 may support communication services over packet-switched networks, e.g., the public Internet, including Voice over Internet Protocol (VOIP). One or more of user device 16 may also support communication services over circuit-switched networks, e.g., the public switched telephone network (PSTN).

Each of user devices 16 is operated by a user (i.e., the caller) that may be a customer or a non-customer of the organization that provides contact center 12. In the case of a business or corporate customer, the user may be a representative of the business or corporate customer. In some examples, the user may be a non-human robo-caller utilized by a fraudster or bad actor. In general, each of user devices 16 may represent a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure. Although not shown in FIG. 1, one or more of user devices 16 may be associated with a display device, e.g., either integrated within the user device or in communication with the user device, on which to present a user interface.

Telecom network 14 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, telecom network 14 may comprise a combination of multiple networks.

Contact center 12 may comprise a centralized or distributed network of the disparate computing systems made up of interconnected desktop computers, laptops, workstations, wireless devices, network-ready appliances, file servers, print servers, or other computing devices. For example, contact center 12 may comprise one or more data centers including a plurality of servers configured to provide account services interconnected with a plurality of databases and other storage facilities in which customer credentials, customer profiles, and customer accounts are stored. Contact center 12 may include both "front-end systems" with which the customers or non-customers of the organization directly interact to resolve service inquiries, and "back-end systems" in which information about contact center 12, the organization, or existing customers of the organization is maintained.

In the example of FIG. 1, contact center 12 includes one or more interactive voice response (IVR) systems 22, one or more agent desktop systems 24 used by a number of human agents that are representatives of the organization, and a customer relationship management (CRM) system 26 as "front-end systems." In this example, the front-end systems may be used by the organization to interact with its customers to resolve the customers' service inquiries. Contact center 12 also includes contact center control system 18, a call routing system 20, and an event log system 28 as "back-end systems." In this example, the back-end systems may be tools used by the organization to facilitate the functions of contact center 12, including collecting, storing, and maintaining data used by contact center 12. In addition, contact center 12 interacts with fraud detection system 17 as another "back-end system," which may be included in contact center 12 itself or may be administered by a third-party network (not shown). The architecture of contact center 12 illustrated in FIG. 1 is shown for exemplary purposes only and should not be limited to this architecture. In other examples, contact center 12 may include more, fewer, or different computing systems configured to handle customer service inquiries.

In the example of FIG. 1, one of user devices 16, e.g., user device 16A, may initiate a call to contact center 12 in response to input from a user of user device 16A. User device 16A outputs a signal over telecom network 14. Fraud detection system 17 may operate as a gateway to contact center 12 by providing an initial determination of whether an inbound call is fraudulent. For example, fraud detection system 17 may compare markers, e.g., phoneprints or voiceprints, for the inbound call to known fraudsters, and provide risk information to contact center 12. In some examples, fraud detection system 17 may be implemented using fraud detection solutions for call centers available through Pindrop®. Fraud detection system 17 may provide a risk score or other indication of potentially fraudulent intent for each inbound call to contact center 12.

Call routing system 20 receives the inbound call from telecom network 14 and determines whether to route the inbound call to one of IVR systems 22 or one of agent desktop systems 24. Call routing system 20 may route calls to one of a number of destinations, including to IVR systems 22, agent desktop systems 24, or to other devices, users, or systems. In some examples, call routing system 20 may be implemented using call routing solutions available through Genesys Telecommunications Laboratories. In an example where user device 16A requests to speak with a human agent or selects a service that can only be performed by a human agent, call routing system 20 routes the call to one of agent desktop systems 24, thereby enabling a user of user device 16A and a human agent at the one of agent desktop systems 24 to engage in a voice communication session. In an example where user device 16A selects a service for which an IVR program is available, call routing system 20 routes the call to the appropriate one of IVR systems 22, thereby enabling the user of user device 16A to interact with the IVR program.

Authentication of the user operating user device 16A may be performed by either an authentication IVR program provided by one of IVR systems 22 or any of the human agents at agent desktop systems 24. As one example, the one of IVR systems 22 may issue authentication challenges to the user of user device 16A during the call, store the responses received from the user via user device 16A, and, based on the responses, make a determination about whether the user of user device 16A is authenticated or issue additional authentication challenges. As an alternative example, a human agent at one of agent desktop systems 24 may issue authentication challenges to the user of user device 16A during the voice communication session and, upon hearing the response of the user of user device 16A, the human agent may make a determination about whether the user of user device 16A is authenticated or issue additional authentication challenges. In either example, the authentication determination may be based on customer credentials accessible from CRM system 26 and/or contact center control system 18.

Once the user of user device 16A is authenticated as a customer of the organization, one or more of IVR systems 22 and/or the human agents at agent desktop systems 24 may process account service inquiries received from the customer via user device 16A. In the example of a bank or other financial institution, the account service inquiries may include account balance inquiries, most recent transaction inquiries, money transfers, opening or closing accounts, updating or resetting security credentials, changing or rebalancing investment funds, and the like. IVR systems 22 and the human agents at agent desktop systems 24 may process the account service inquiries by accessing customer accounts and/or accessing customer profiles via CRM system 26.

Event log system 28 may be configured to generate an entry in a centralized event log for each voice call into contact center 12. Event log system 28 is configured to gather and store data for the call from across the plurality of disparate systems used by contact center 12 to service the call. For example, event log system 28 may gather call data associated with actions performed during the call from the front-end systems within contact center 12, e.g., IVR systems 22, agent desktop systems 24, and CRM system 26. Event log system 28 may also gather context data associated with origins of the call from the back-end systems of contact center 12, e.g., fraud detection system 17 and call routing system 20. Event log system 28 may be configured to include both the call data and the context data in the call entry in the centralized event log, and to correlate the call entry with previous call entries for the same user to provide historical call data. Event log system 28 may gather the call data and the context data by requesting the data via application programming interfaces (APIs) for the disparate systems and/or by receiving the data via event log software plugins installed in the disparate systems.

In some examples, the call entry for the incoming call and any of the correlated call entries within the centralized event log may be accessible by IVR systems 22, agent desktop systems 24, or any other front-end system for use in determining how to handle the call, e.g., whether to continue the call as usual, or otherwise route or end the call in the case of a potential fraud determination. In some other examples, event log system 28 itself may analyze the data in the call entry along with the correlated call entries within the centralized event log to determine a fraud risk score of the call for use by the front-end system in making a fraud determination.

As described above, contact center 12 includes several systems configured to monitor the calls into contact center 12, predict whether each of the calls comprises a potentially fraudulent access to a customer account via contact center 12, and respond appropriately. Fraud prevention systems implemented by contact center 12, however, may be relatively conservative with respect to applying interdiction schemes or completely blocking suspicious calls for fear of obstructing legitimate customers from accessing their accounts with the organization via contact center 12. In order to improve fraud prevention within contact center 12, it may be beneficial to provide some means by which the customers self-monitor the calls and account activity associated with their accounts via contact center 12. The customers may be better able to identify potentially fraudulent accesses than the organization because the customers likely know at least some details of the legitimate calls they have recently placed into contact center 12 and, thus, can more easily identify illegitimate calls.

According to the techniques described in this disclosure, contact center control system 18 is configured to enable customers of the organization to self-monitor account activity that occurs via contact center 12 and, in response, modify account access settings for contact center 12. As a first aspect of the disclosed techniques, contact center control system 12 is configured to provide a call history associated with a given customer and one or more of the customer's accounts with the organization. More specifically, contact center control system 18 generates the call history including one or more calls into contact center 12 that are associated with the one or more accounts of the customer. Each entry in the call history may represent a single call into contact center 12 and may include some, but not all, of the call data and the context data included in a corresponding entry for the call in the centralized event log generated by event log system 28. For example, the data included in the call history may be defined as access information indicating how each of the one or more calls accessed the account of the customer via contact center 12.

Contact center control system 18 then sends data representative of the call history to a user device of the customer, e.g., one of user devices 16. In this way, based on the call history, the customer may perform self-monitoring of the calls into contact center 12 that accessed the customer's accounts, and notify the organization if any of the calls appear suspicious or are unfamiliar. For example, in response to the data representative of the call history, contact center control system 18 may receive an indication from the user device of the customer that at least one of the calls included in the call history comprises a potentially fraudulent access to the account of the customer. In response to the indication of the potentially fraudulent access, contact center control system 18 may report the indicated calls to the fraud prevention system of contact center 12.

As a second aspect of the disclosed techniques, contact center control system 18 is configured to enable modification of account access settings that define restrictions on accessing the accounts of the customer via contact center 12. More specifically, contact center control system 18 may send, to the user device of the customer, data representative of a user interface used to present and receive changes to the account access settings for the accounts of the customer. In this way, via the user interface, the customer may modify their account access settings, including changing which types of authentication methods are enabled to access the customer's accounts via contact center 12 and, in some cases, turning off all access to one or more of the customer's accounts via contact center 12. The account access settings may be linked or associated with customer credentials stored in CRM system 26 for the accounts of the customer.

Any changes made to the account access settings for the customer's accounts may be applied to subsequent calls into contact center 12 attempting to access the accounts of the customer. As described above, authentication of a user may be performed by either an authentication IVR program provided by one of IVR systems 22 or any of the human agents at agent desktop systems 24 based on customer credentials accessible from CRM system 26 and/or contact center control system 18. More specifically, contact center control system 18 may provide account access settings for an account of a customer to the one of the front-end systems, e.g., IVR systems 22, agent desktop systems 24, or CRM system 26, for use in determining whether to allow a subsequent call into contact center 12 to gain access to the account of the customer. For example, if the subsequent call is attempting to gain access to the account of the customer using an authentication method that has been disabled in the account access settings for the account of the customer, then the front-end system will deny the access attempt even if the credentials received for the disabled authentication method are correct.

Figure 2:
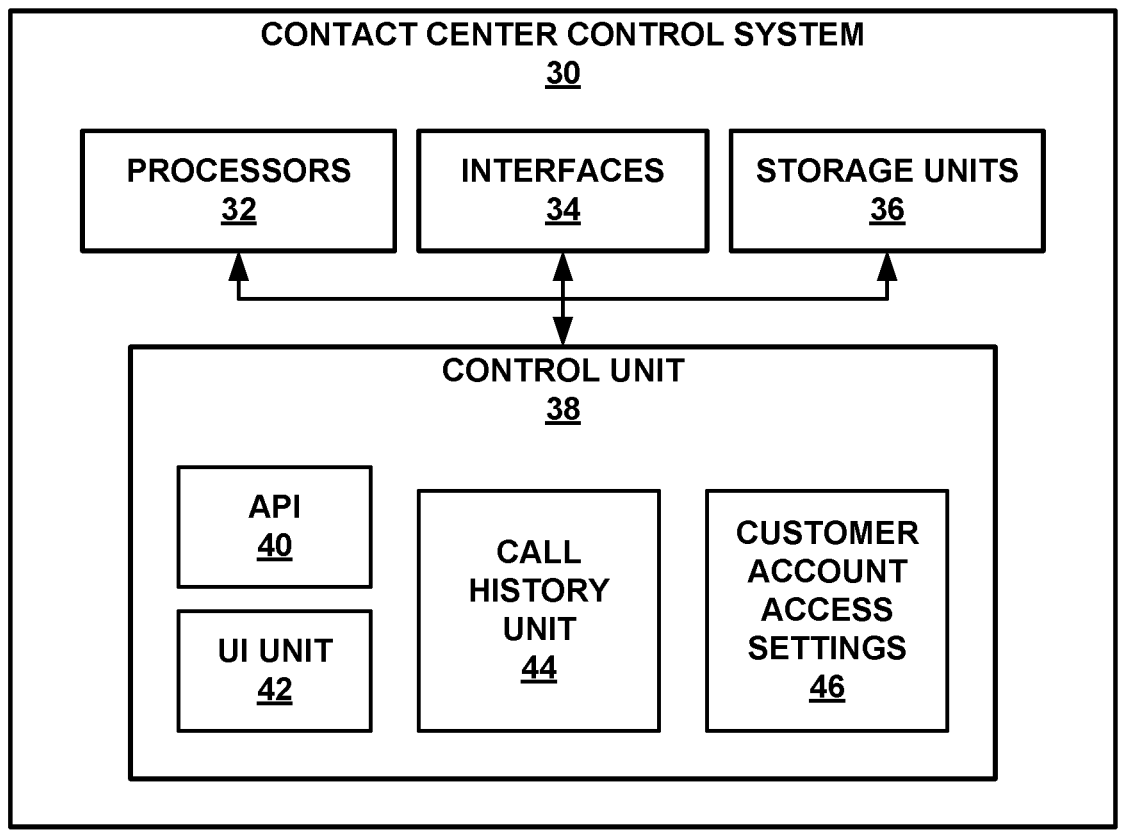
FIG. 2 is a block diagram illustrating an example of a contact center control system within a contact center, in accordance with the techniques of this disclosure.

FIG. 2 is a block diagram illustrating an example of a contact center control system 30 within a contact center, in accordance with the techniques of this disclosure. Contact center control system 30 of FIG. 2 may be described as an example implementation of contact center control system 18 within contact center 12 of FIG. 1. One or more aspects of contact center control system 30 of FIG. 2 may be described within the context of contact center 12 of FIG. 1.

Contact center control system 30 is configured to enable customers of an organization to self-monitor account activity and modify account access settings for contact center 12 of the organization. The architecture of contact center control system 30 illustrated in FIG. 2 is shown for exemplary purposes only. Contact center control system 30 should not be limited to the illustrated example architecture. In other examples, contact center control system 30 may be configured in a variety of ways.

Contact center control system 30 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, contact center control system 30 represents a cloud computing system, server farm, and/or server cluster (or portion thereof) that provides services to client devices and other devices or systems. In other examples, contact center control system 30 may represent or be implemented through one or more virtualized compute instances (e.g., virtual machines, containers) of a data center, cloud computing system, server farm, and/or server cluster.

As shown in the example of FIG. 2, contact center control system 30 includes one or more processors 32, one or more interfaces 34, one or more storage units 36. Contact center control system 30 also includes control unit 38, which may be implemented as program instructions and/or data stored in storage units 36 and executable by processors 32 or implemented as one or more hardware units or devices of contact center control system 30. Storage units 36 of contact center control system 30 may also store an operating system (not shown) executable by processors 32 to control the operation of components of contact center control system 30. The components, units or modules of contact center control system 30 are coupled (physically, communicatively, and/or operatively) using communication channels for inter-component communications. In some examples, the communication channels may include a system bus, a network connection, an inter-process communication data structure, or any other method for communicating data.

Processors 32, in one example, may comprise one or more processors that are configured to implement functionality and/or process instructions for execution within event log system 30. For example, processors 32 may be capable of processing instructions stored by storage units 36. Processors 32 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 36 may be configured to store information within contact center control system 30 during operation. Storage units 36 may include a computer-readable storage medium or computer-readable storage device. In some examples, storage units 36 include one or more of a short-term memory or a long-term memory. Storage units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 36 are used to store program instructions for execution by processors 32. Storage units 36 may be used by software or applications running on contact center control system 30 (e.g., control unit 38) to temporarily store information during program execution.

Contact center control system 30 may utilize interfaces 34 to communicate with external systems via one or more networks, e.g., contact center 12 of FIG. 1. Interfaces 34 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, contact center control system 30 utilizes interfaces 34 to wirelessly communicate with external systems, e.g., CRM system 26 and event log system 28 of contact center 12 from FIG. 1.

In the illustrated example of FIG. 2, control unit 38 includes an application programming interface (API) 40, a user interface (UI) unit 42, a call history unit 44, and customer account access settings 46. In accordance with the disclosed techniques, control unit 38 is configured to facilitate customer self-help with respect to security monitoring and account access settings for contact center 12.

Contact center control system 30 receives event log data for contact center 12 from event log system 28. Contact center control system 30 may receive the event log data via interfaces 34 or API 40, and forward the event log data to call history unit 44 of control unit 38. For example, API 40 may be configured to "pull" the event log data from the centralized event log maintained by event log system 28 using defined request and response messages with APIs for event log system 28. Although illustrated in FIG. 2 as including a single API, in other examples, contact center control system 30 may include a plurality of APIs.

Call history unit 44 of control unit 38 is configured to generate a call history for a given customer that includes one or more calls into contact center 12 that are associated with an account of the customer. Call history unit 44 may generate the call history based on the received event log data of the one or more calls included in corresponding entries of the centralized event log maintained by event log system 28. In some examples, call history unit 44 may generate the call history for the given customer as a stripped-down version of the corresponding entries of the centralized event log. The generation and maintenance of the centralized event log is described in more detail below with respect to FIG. 3.

In general, the data included in the call history may be defined as access information indicating how each of the one or more calls accessed the account of the customer via contact center 12. In one example, call entry unit 44 may generate each entry in the call history for the given customer to include the date and time at which the call was placed into context center 12, a phone number from which the call was placed (i.e., the Automatic Number Identification (ANI) for the caller), an account type or number of the customer, an authentication method used to access the identified account, and one or more actions performed during the call. In other examples, the call history may include more, fewer, or different types of data associated with each of the calls into contact center 12 requesting access to the customer's account.

Control unit 38 then sends data representative of the call history to a user device, e.g., one of user devices 16 from FIG. 1, of the customer via interfaces 34. In one example, UI unit 42 sends data representative of a user interface used to present an interactive version of the call history to the user device of the customer via interfaces 34. Control unit 38 may send a notification that includes the data representative of the call history to the user device of the customer on a periodic basis, e.g., once per week, once per month, or the like. In one scenario, the notification may be in the form of an email, text, or other communication that includes a link to the organization's website through which the customer may login and view the call history. In another scenario, the notification may be embedded within an application, such as a mobile banking application, running on the customer's user device in the form of a push notification or an in-app reminder that appears upon opening the application. In this scenario, the customer may be able to login and view the call history directly in the application. The call history notification settings may be configurable by the customer via the customer account access settings 46.

Based on the call history, the customer may perform self-monitoring and notify the organization if any of the calls appear suspicious or are unfamiliar. For example, the customer may recognize the legitimate calls that they recently placed into contact center 12 and also identify illegitimate calls based on unfamiliar ANIs that are not phone numbers used by the customer, odd times and dates of the calls at which the customer does not remember placing a legitimate call, and/or requested actions during the calls that the customer does not remember requesting. In some examples, the interactive version of the call history may include a report button for each of the one or more call entries such that the customer may select the report button to indicate that a given call comprises a potentially fraudulent access to the account of the customer. In some examples, control unit 38 may be configured to receive the reports of suspicious calls from the user device of the customer, and, in turn, send the reports to a fraud prevention system of the organization.

In addition, control unit 38 may enable modification of customer account access settings 46 by the customer. In general, customer account access settings 46 comprise customizable settings for each account of the customer with the organization that define restrictions on accessing the account of the customer via contact center 12. For example, customer account access settings 46 for a given account of the customer may include a status (e.g., enabled or disabled) of each of a plurality of different types of authentication methods to access the given account via contact center 12. Customer account access settings 46 for the given account may include a switch by which the customer may require two-factor authentication to access the given account via contact center 12. In addition, customer account access settings 46 for the given account may include a white list of approved phone numbers for calls into contact center 12 attempting to access the given account, and a black list of blocked phone numbers for calls into contact center 12 attempting to access the given account. Moreover, customer account access settings 46 may include a "master switch" by which the customer may turning off or disable all access to the given account of the customer via contact center 12. Customer account access settings 46 may also include configurable call history notification settings that define the means and the frequency by which control unit 38 should send the call history notifications to the user device of the customer.

Based on the call history, control unit 38 may receive data representative of changes to customer account access settings 46 from the user device of the customer. Prior to receiving the changes to customer account access settings 46, control unit 38 may receive a request from the user device of the customer to review customer account access settings 46 for the account of the customer. This request may be prompted by the customer's review of the call history and identification of one or more suspicious calls attempting to access the customer's account via contact center 12 using the same type of authentication method, e.g., the last four digits of the customer's social security number (SSN-4). The customer may request to review customer account access settings 46 in order to disable the SSN-4 authentication method for the account. In one example, the interactive version of the call history may include call entries in which portions of the access information are linked to customer account access settings 46 for the account of the customer. In this example, the received request to review customer account access settings 46 may comprise the selection of the linked authentication method used by one of the calls included in the interactive call history.

In response to the request, UI unit 42 may send data representative of a user interface used to present and receive the changes to customer account access settings 46 for the account of the customer to the user device of the customer via interfaces 34. Through the user interface, the customer may modify customer account access settings 46 for the given account of the customer. For example, the customer may disable certain types of authentication methods, e.g., SSN-4, previously used to gain access to the given account of the customer via contact center 12.

Control unit 38 is further configured to provide customer account access settings 46 for the given account of the customer to one or more front-end systems within contact center 12 for use in determining whether to allow subsequent calls into contact center 12 to access the given account. In some examples, control unit 38 may be configured update the customer credentials stored in CRM system 26 for the given account of the customer based on the changes to customer account access settings 46. In this way, the front-end systems, e.g., IVR systems 22 or agent desktop systems 24, performing authentication of the subsequent calls into contact center 12 based on the customer credentials accessible from CRM system 26 may apply the appropriate restrictions on accessing the given account of the customer via contact center 12. In other examples, control unit 38 may be configured to provide customer account access settings 46 for the given account of the customer to the front-end systems in response to requests from the front-end systems to lookup customer account access settings 46 for the given account.

Figure 3:
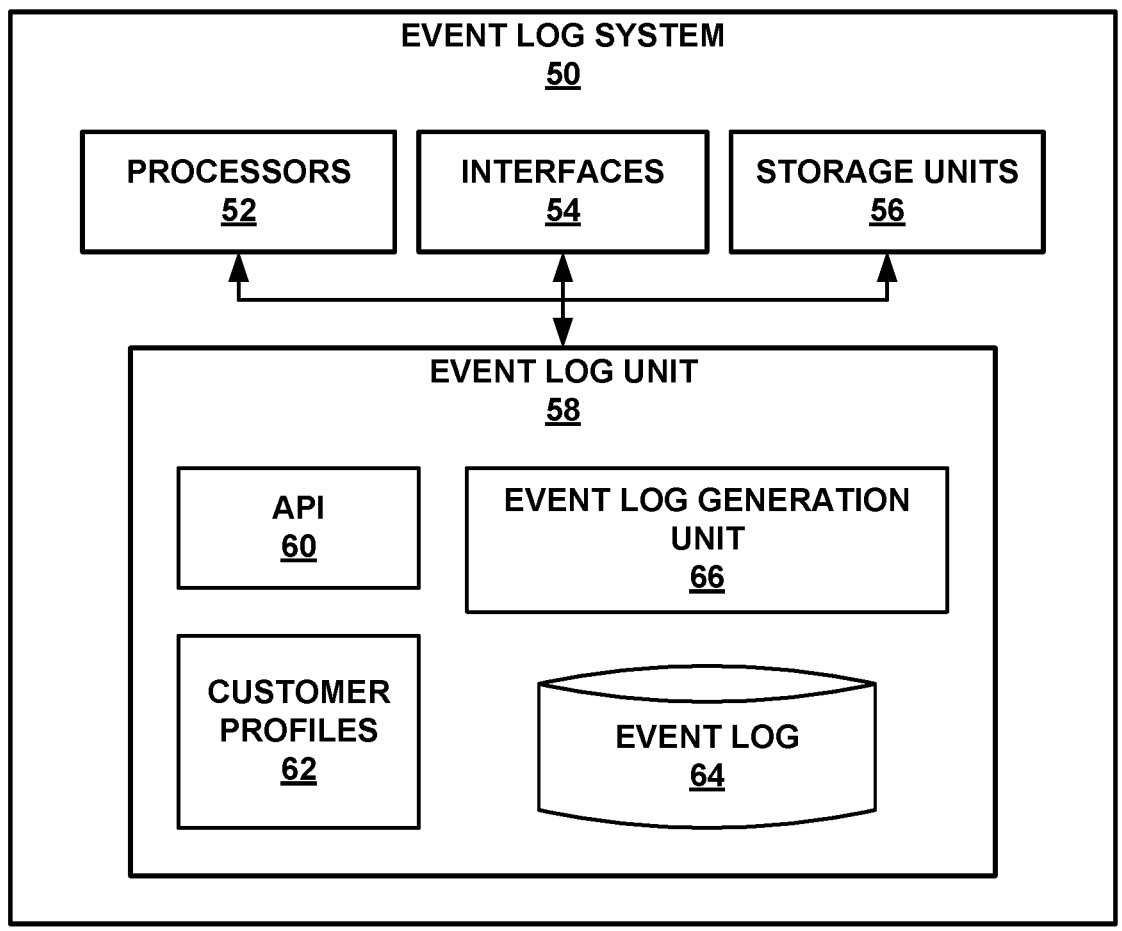
FIG. 3 is a block diagram illustrating an example of an event log system within a contact center, in accordance with the techniques of this disclosure.

FIG. 3 is a block diagram illustrating an example of an event log system 50 within a contact center, in accordance with the techniques of this disclosure. Event log system 50 of FIG. 3 may be described as an example implementation of event log system 28 within contact center 12 of FIG. 1. One or more aspects of event log system 50 of FIG. 3 may be described within the context of contact center 12 of FIG. 1.

Event log system 50 is configured to collect data for each call into contact center 12 from multiple disparate systems within contact center 12, and create an entry in a centralized event log 64 in which to store the data. In this way, the pertinent data for the call is stored in a centralized location and accessible by contact center control system 30 for use in generating interactive call histories for customer review. The architecture of event log system 50 illustrated in FIG. 3 is shown for exemplary purposes only. Event log system 50 should not be limited to the illustrated example architecture. In other examples, event log system 50 may be configured in a variety of ways.

Event log system 50 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, event log system 40 represents a cloud computing system, server farm, and/or server cluster (or portion thereof) that provides services to client devices and other devices or systems. In other examples, event log system 50 may represent or be implemented through one or more virtualized compute instances (e.g., virtual machines, containers) of a data center, cloud computing system, server farm, and/or server cluster.

As shown in the example of FIG. 3, event log system 50 includes one or more processors 52, one or more interfaces 54, one or more storage units 56. Event log system 50 also includes event log unit 58, which may be implemented as program instructions and/or data stored in storage units 56 and executable by processors 52 or implemented as one or more hardware units or devices of event log system 50. Storage units 56 of event log system 50 may also store an operating system (not shown) executable by processors 52 to control the operation of components of event log system 50. The components, units or modules of event log system 50 are coupled (physically, communicatively, and/or operatively) using communication channels for inter-component communications. In some examples, the communication channels may include a system bus, a network connection, an inter-process communication data structure, or any other method for communicating data.

Processors 52, in one example, may comprise one or more processors that are configured to implement functionality and/or process instructions for execution within event log system 50. For example, processors 52 may be capable of processing instructions stored by storage units 56. Processors 52 may include, for example, microprocessors, DSPs, ASICs, FPGAs, or equivalent discrete or integrated logic circuitry, or a combination of any of the foregoing devices or circuitry.

Storage units 56 may be configured to store information within event log system 50 during operation. Storage units 56 may include a computer-readable storage medium or computer-readable storage device. In some examples, storage units 56 include one or more of a short-term memory or a long-term memory. Storage units 56 may include, for example, RAM, DRAM, SRAM, magnetic discs, optical discs, flash memories, or forms of EPROM or EEPROM. In some examples, storage units 56 are used to store program instructions for execution by processors 52. Storage units 56 may be used by software or applications running on event log system 50 (e.g., event log unit 58) to temporarily store information during program execution.

Event log system 50 may utilize interfaces 54 to communicate with external systems via one or more networks, e.g., contact center 12 of FIG. 1. Interfaces 54 may be network interfaces (such as Ethernet interfaces, optical transceivers, RF transceivers, Wi-Fi or Bluetooth radios, or the like), telephony interfaces, or any other type of devices that can send and receive information. In some examples, event log system 50 utilizes interfaces 54 to wirelessly communicate with external systems, e.g., fraud detection system 17, contact center control system 18, call routing system 20, IVR systems 22, agent desktop systems 24, or CRM system 26 of contact center 12 from FIG. 1.

In the illustrated example of FIG. 3, event log unit 58 includes an API 60, customer profiles 62, event log 64, and event log generation unit 66. Event log unit 58 is configured to create centralized event log 64 to capture, store, and share data associated with each call into a contact center, e.g., contact center 12 of FIG. 1. Although illustrated in FIG. 3 as being included in event log system 50, in other examples, event log 64 may be maintained externally in one or more of a plurality of databases and other storage facilities accessible via contact center 12. Although illustrated in FIG. 3 as including a single API 60, in other examples, event log system 50 may include a plurality of APIs to pull the data from the plurality of disparate systems within contact center 12.

When a call enters contact center 12, event log system 50 may receive a notification of the inbound call from fraud detection system 17, call routing system 20, or another computing device that performs at least some gateway functions for contact center 12. Such a notification may be received via interfaces 54 of event log system 50 and forwarded to event log generation unit 66 of event log unit 58. Event log generation unit 66 creates an entry for the inbound call in centralized event log 64.

As the call progresses through contact center 12, e.g., entering one of IVR systems 22 or entering a voice communication session with a human agent at one of agent desktop systems 24, event log unit 58 updates and appends information to the call entry in centralized event log 64. The information included in the call entry in centralized event log 64 at least includes call data associated with actions performed during the call and context data associated with origins of the call. Event log unit 58 may receive the different types of information for the call from the disparate systems in contact center 12 using different types of data collectors, e.g., as "pushed" data fed to event log system 50 from software plug-ins installed on the disparate systems, and/or as "pulled" data requested and retrieved from the disparate system by event log system 50 via API 60.

For example, event log system 50 gathers call data associated with actions performed during the inbound call from the front-end systems within contact center 12. Event log system 50 may receive the call data via interfaces 54 or API 60, and forward the call data to event log generation unit 66 of event log unit 58. Event log generation unit 66 includes the received call data in the entry for the inbound call in centralized event log 64. The call data may include details regarding caller authentication, customer account access, and/or customer account servicing performed via IVR systems 22, agent desktop systems 24, CRM system 26, or other customer-facing systems included in contact center 12. More specifically, the call data associated with authentication may include an inbound Automatic Number Identification (ANI) for the caller, a customer account identified by the caller, and an authentication method used by the caller. The call data associated with customer account access and/or customer account servicing may include a list of actions performed by one or more IVR programs accessed by the caller, a list of actions performed by one or more human agents having voice communication sessions with the caller, and changes to the customer's account and/or security settings requested by the caller.

As a further example, event log system 50 gathers context data associated with origins of the inbound call from the back-end systems within contact center 12. Event log system 50 may receive the context data via interfaces 54 or API 60, and forward the context data to event log generation unit 66 of event log unit 58. Event log generation unit 66 appends the context data to the call entry in centralized event log 64. The context data may include details regarding fraud risk assessment, connection channel, and customer account identification for the call determined or maintained by fraud detection system 17, call routing system 20, or other systems included in contact center 12. More specifically, the context data associated with fraud risk assessment may include risk information, such as a risk score or other indication of potentially fraudulent intent. The context data associated with the connection channel may include the inbound ANI for the call, a toll-free number dialed by the caller to access the contact center, a connection ID assigned to the call, a date stamp, start and end time stamps of the call, call duration, and an initiating endpoint (e.g., conventional phone or computing device running VOIP) of the call. In addition, the context data associated with the connection channel may include whether the call was routed between human agents or IVRs, the specific IVR programs used to service the call and/or the names of the human agents to whom the caller was connected during the call. The context data associated with customer account identification may include one or more account numbers that belong to the user identified for the call.

Event log generation unit 66 may be configured to correlate the call entry for the inbound call with other call entries in event log 64 for a same user identified for the inbound call. For example, event log generation unit 66 identifies the user associated with the inbound call based on at least a portion of the data for the inbound call. For example, event log generation unit 66 may match at least one of the ANI, an account number, or other identifying information for the inbound call to one of customer profiles 62 to identify the user associated with the call. Event log generation unit 66 then links the call entry for the inbound call to the other call entries for the same user in centralized event log 64. Customer profiles 62 may be generated based on customer base information learned from CRM system 26. Customer profiles 62 may identify multiple different accounts, phone numbers (i.e., ANIs), or other touchpoints that resolve to the same user. In addition, customer profiles 62 may include customer behavior and preferences with respect to authentication and accessing accounts via contact center 12. In some examples, customer profiles 62 maintained by event log system 28 may be updated based on changes to account access settings received from customers via contact center control system 18.

More details with respect to the event log system may be found in U.S. patent application Ser. No. 15/905,318, filed Feb. 26, 2018, entitled "Centralized Event Log Generation and Analysis for Contact Centers," the entire content of which is incorporated herein by reference.

Figure 4:
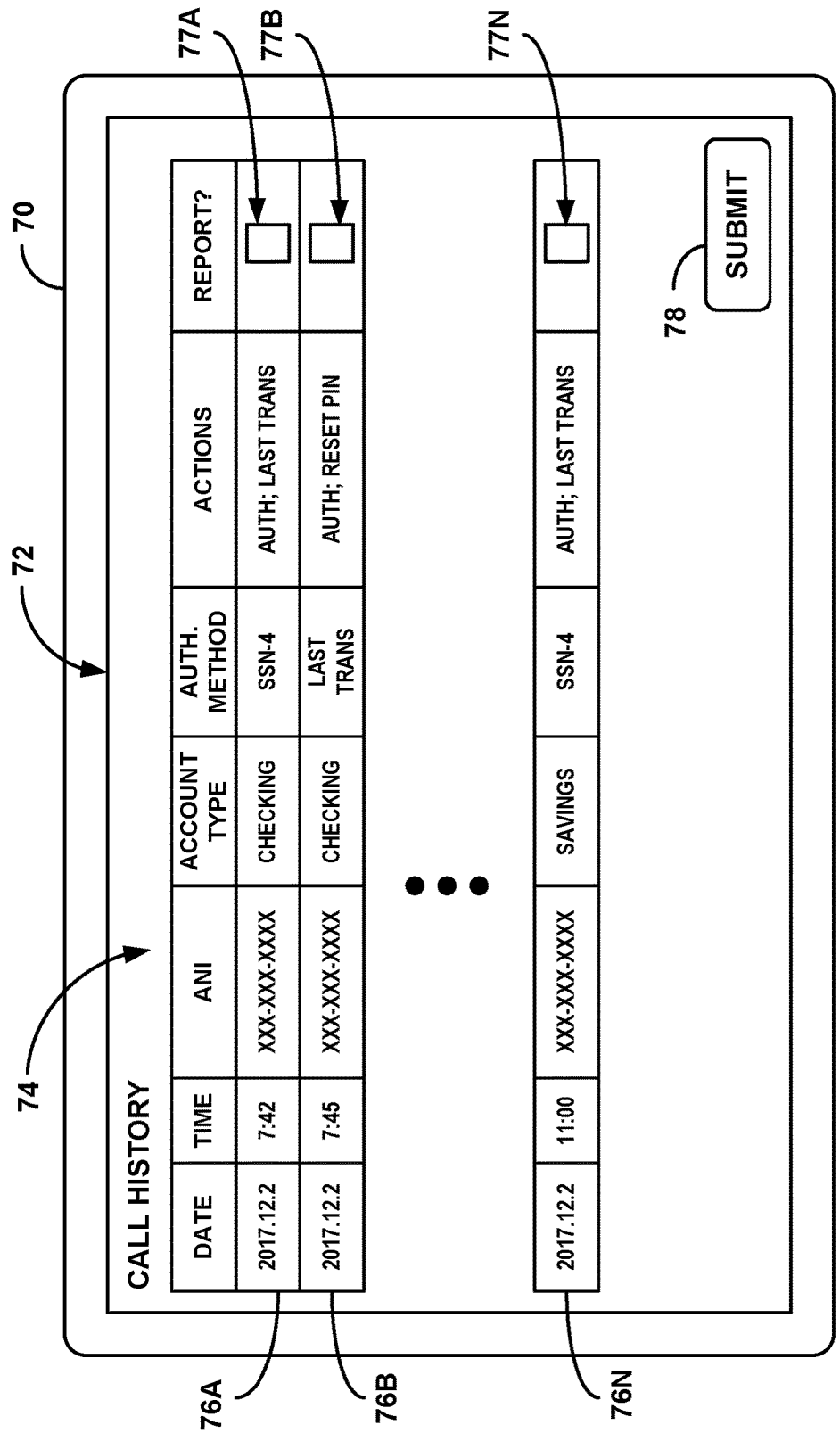
FIG. 4 is a conceptual diagram illustrating an example user interface used to present an interactive call history provided by a contact center control system, in accordance with the techniques of this disclosure.

FIG. 4 is a conceptual diagram illustrating an example user interface 72 used to present an interactive call history 74 provided by contact center control system 30 of FIG. 2, in accordance with the techniques of this disclosure. As described above with respect to FIG. 2, call history unit 44 of contact center control system 30 is configured to generate a call history that includes one or more calls into contact center 12 that are associated with an account of the customer. Contact center control system 30 then sends data representative of the call history to a user device of the customer. In this way, based on review of the call history, the customer is able to self-monitor calls into contact center 12 that access the customer's account, and notify the organization if any of the calls appear suspicious or are unfamiliar.

In the example illustrated in FIG. 4, the data representative of the call history represents user interface 72 used to present interactive call history 74 on a display device 70 associated with the user device, e.g., one of user devices 16 from FIG. 1. In the illustrated example, interactive call history 74 includes entries 76A-76N (collectively, "entries 76") for the calls into contact center 12 that are associated with an account of the customer. Entries 76 may represent the most recent calls associated with the accounts of the customer. For example, entries 76 may represent all the calls associated with the accounts of the customer that have been received by contact center 12 over the last week, month, or other specific time period. In other examples, entries 76 may represent all the calls associated with the accounts of the customer that have not been previously reviewed by the customer.

In the illustrated example, each of the entries 76 within interactive call history 74 includes the following data fields:

date, time, ANI, account type, authentication method, and actions. The date field and the time field indicate the date and time at which the inbound call was received by contact center 12. The ANI field indicates the phone number of the user device from which the inbound call originated. The ANI may be automatically identified by call routing system 20 upon receipt of the inbound call. The account type field indicates whether the account accessed by the call was a checking, savings, brokerage, or other account with the organization. In some examples, the account type field may use customer specified names for the different accounts held by the customer with the organization to ease customer recognition.

The authentication method field indicates the method by which the caller was authenticated or attempted to be authenticated. Some example authentication methods include the last four digits of a customer's social security number (SSN-4), the customer's mother's maiden name, the last several transactions performed using at least one of the accounts of the customer, and a personal identification number (PIN). The actions field indicates a list of actions performed by either IVR systems 22 or agent desktop systems 24 to service the inbound call. The actions may include authentication, retrieving customer account information, retrieving the last several transactions performed using a specific account, initiating a fund transfer, changing account settings, resetting a PIN or other security credentials, or the like.

Each of the entries 76 includes a respective one of report buttons 77A-77N (collectively, "report buttons 77"). As can be seen in FIG. 4, report buttons 77 may take the form of check boxes or radio/toggle buttons. The customer may select one or more of report buttons 77 to indicate that the calls recorded in the respective call entries 76 are suspicious or unfamiliar. The customer may then select the submit button 78 also presented by user interface 72 to send a report of the suspicious calls to either contact center control system 30 or directly to a fraud prevention system of the organization. In some examples, one or more of the data fields included in each of call entries 76 may be linked to the user interface used to receive changes to customer account access settings 46 for the account of the customer. For example, with respect to call entry 76A, the authentication method, i.e., SSN-4, may be linked to the portion of the user interface used to receive the changes to the enablement or disablement of the different authentication methods for the checking account of the customer. As another example, with respect to call entry 76N, the ANI may be linked to the portion of the user interface used to receive changes to lists of allowed and blocked phone numbers for the savings account of the customer.

Figure 5:
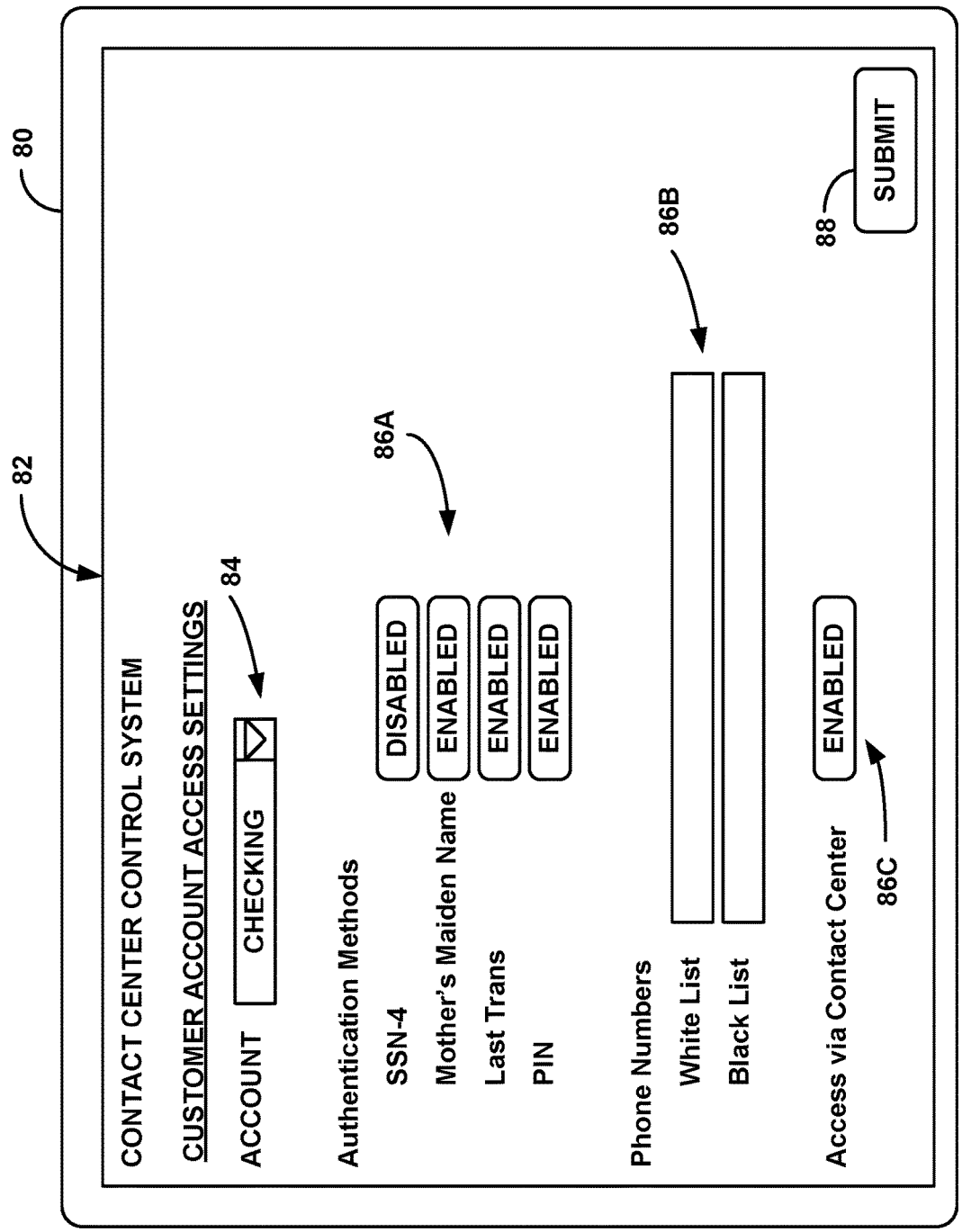
FIG. 5 is a conceptual diagram illustrating an example user interface used to present account access settings provided by a contact center control system, in accordance with the techniques of this disclosure.

FIG. 5 is a conceptual diagram illustrating an example user interface 82 used to present account access settings provided by contact center control system 30 of FIG. 2, in accordance with the techniques of this disclosure. As described above with respect to FIG. 2, contact center control system 30 sends data representative of a user interface used to present and receive the changes to customer account access settings 46 for the account of the customer. In this way, based on review of the call history, the customer is able to modify one or more of customer account access settings 46 to define restrictions on accessing the accounts of the customer via contact center 12.

In the example illustrated in FIG. 5, the data representative of user interface 82 is used to present and receive changes to customer account access settings for a customer account on a display device 80 associated with the user device, e.g., one of user devices 16 from FIG. 1. In some cases, the customer may have several accounts with the organization. In those cases, user interface 82 presents a drop-down menu 84 for selecting one of the accounts for which to modify customer account access settings 86. In some cases, the account drop-down menu 84 may include account numbers or customer specified names for the different accounts held by the customer with the organization to ease customer recognition.

For the selected customer account, e.g., the customer's checking account in the example of FIG. 5, user interface 82 presents the current customer account access settings and also provides interactive fields 86A-86C with which the customer may modify the settings. As illustrated in FIG. 5, user interface 82 presents status indicator buttons 86A (e.g., enabled or disabled) for each of a plurality of different types of authentication methods available to access the selected account of the customer via contact center 12. Each of the status indicator buttons 86A may be a toggle or radio button that enables the customer to change the status of the respective authentication method, e.g., from enabled to disabled or vice versa, by simply selecting the one of status indicator buttons 86A. In the example of FIG. 5, the SSN-4 authentication method has been disabled for the customer's checking account such that no caller may gain access to the customer's checking account via contact center 12 using SSN-4 to authenticate. For example, the customer may disable the SSN-4 authentication method after identifying several suspicious calls in the call history that were accessing the customer's checking account via contact center 12 using SSN-4 to authenticate.

As further illustrated in FIG. 5, user interface 82 presents lists 86B of incoming phone numbers including a white list of phone numbers approved to access the customer's checking account, and a black list of phone number blocked from accessing the customer's checking account. Each of the lists may be modified by the customer to add and/or remove phone numbers. For calls entering contact center 12 from any of the approved phone numbers on the white list, the calls may still need to be authenticated using one of the enabled authentication methods in order to gain access to the customer's checking account. For calls entering contact center 12 from any of the blocked phone numbers on the black list, the calls may be automatically dropped or redirected to a fraud prevention system of the organization. For example, the customer may add a phone number to the black list after identifying several calls in the call history originating from an unfamiliar phone number that were accessing the customer's checking account via contact center 12.

As illustrated in FIG. 5, user interface 82 also presents a master status button 86C or "master switch" that enables the customer to enable or disable all access 86C to the customer's checking account via contact center 12. In the example of FIG. 5, access to the customer's checking account via contact center 12 is enabled, subject to the constraints of the other customer account access settings for the customer's checking account.

Once the customer has made any desired changes to the customer account access settings via user interface 82 for the selected customer account, the customer may select the submit button 88 also presented by user interface 82 to save the changes to customer account access settings 46 stored by contact center control system 30. In response to selecting submit button 88, contact center control system 30 may be configured update the customer credentials stored in CRM system 26 for the given account of the customer based on the changes to the customer account access settings.

Figure 6:
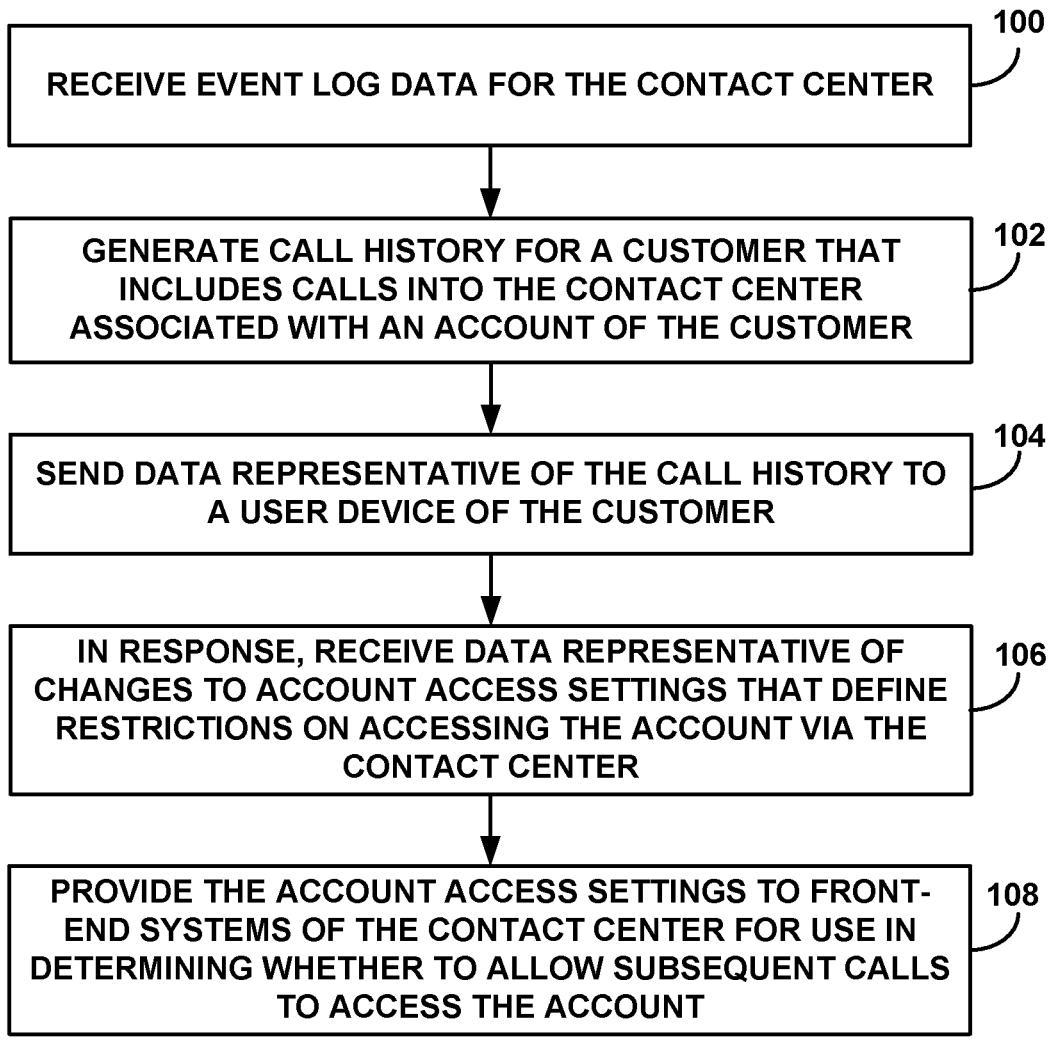
FIG. 6 is a flowchart illustrating an example operation of a computing device of a contact center control system providing an interactive call history and a user interface to customers, in accordance with the techniques of this disclosure.

FIG. 6 is a flowchart illustrating an example operation of a computing device of a contact center control system providing an interactive call history and a user interface to customers, in accordance with the techniques of this disclosure. The example operation of FIG. 6 is described with respect to contact center control system 30 of FIG. 2 and contact center 12 of FIG. 1.

Contact center control system 30 receives event log data for contact center 12 from event log system 28 (100). As described above with respect to FIG. 3, event log data is collected for all calls into contact center 12. The event log data includes context data associated with the origins of each of the calls into contact center 12 and call data associated with actions performed during each of the calls into contact center 12. In some examples, contact center control system 30 may receive the event log data via API 40 for event log system 28.

Call history unit 44 of contact center control system 30 generates a call history for a given customer that includes one or more calls into contact center 12 that are associated with an account of the customer (102). Call history unit 44 generates the call history based on the event log data of the one or more calls that are associated with the account of the customer.

Control unit 38 of contact center control system 30 sends data representative of the call history to a user device of the customer, e.g., one of user device 16 from FIG. 1 (104). For example, control unit 38 may send a notification that includes the data representative of the call history to the user device of the customer on a periodic basis, e.g., once per week, once per month, or the like. In some cases, the notification may be in the form of an email, text, or other communication to the customer's user device. In other cases, the notification may be embedded within an application, e.g., a mobile banking application, running on the customer's user device 16A in the form of a push notification or an in-app reminder that appears upon opening the application.

The data representative of the call history may include access information indicating how each of the one or more calls accessed the account of the customer via contact center 12. As described with respect to FIG. 4, the data representative of the call history may represent a user interface used to present an interactive call history in which portions of the access information included in the interactive call history are linked to customer account access settings 46 for the account of the customer. In addition, as described with respect to FIG. 4, the interactive call history may include a report button for each of the one or more calls for the customer to indicate whether a given call comprises a potentially fraudulent access to the account of the customer.

In response to the data representative of the call history, control unit 38 receives, from the user device of the customer, data representative of changes to customer account access settings 46 that define restrictions on accessing the account of the customer via contact center 12 (106). For example, the received data may represent changes to customer account access settings 46 that either disable or enable different authentication methods that may be used to access the account of the customer via contact center 12. In another example, the received data represents a change to customer account access settings 46 that disables all access to the account of the customer via contact center 12.

In one scenario, in response to the data representative of the call history, control unit 38 may receive an indication from the user device of the customer that at least one of the calls included in the call history comprises a potentially fraudulent access to the account of the customer. For example, the indication may comprise selection of the report button for one of the calls included in the interactive call history presented to the customer via the customer's user device. In response to the indication of the potentially fraudulent access, control unit 38 may report the indicated calls to a fraud prevention system of the organization.

In another scenario, in response to the data representative of the call history, control unit 38 may receive a request from the user device of the customer to review customer account access settings 46 for the account of the customer. In response to the request, control unit 38 may send to the user device data representative of a user interface used to present and receive the changes to customer account access settings 46 for the account of the customer. One example of the user interface used to present and change customer account access settings is described with respect to FIG. 5.

In a further scenario, control unit 38 may receive from the user device of the customer a selection of a linked portion of the access information included in the interactive call history presented to the customer via the customer's user device. In response to the selection of the linked portion of the access information, control unit 38 may send to the user device data representative of the portion of the user interface used to receive the changes to customer account access settings 46 associated with the linked portion of the access information. For example, in response to receipt of a selection of an authentication method used by one of the calls included in the interactive call history to access the account of the customer via control center 12, control unit 38 may send data representative of the portion of the user interface used to receive changes to the enablement or disablement of the different authentication methods for the account of the customer.

Control unit 38 provides customer account access settings 46 for the account of the customer to one or more front-end systems within contact center 12 for use in determining whether to allow subsequent calls into contact center 12 to access the account of the customer (108). For example, control unit 38 may receive a request to lookup customer account access settings 46 for the account of the customer from, e.g., agent desktop systems 24 based on a subsequent call into contact center 12 that is attempting to access the account of the customer, and provide the customer account access settings 46 to agent desktop systems 24 for use in determining whether to allow the subsequent call to gain access to the account of the customer. If the subsequent call is attempting to gain access to the account of the customer using an authentication method that has been disabled in customer account access settings 46 for the account of the customer, then agent desktop systems 24 will deny the access attempt.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
   receiving, by a computing system of an organization and from a user device of a customer having an account at the organization, data representative of changes to account access settings that define restrictions on accessing the account of the customer via a contact center of the organization; and
   providing, by the computing system and to one or more systems within the contact center, the account access settings for the account of the customer for use in determining whether to allow one or more calls into the contact center to access the account of the customer.

2. The computer-implemented method of claim 1, wherein the account access settings at least indicate whether the customer has disabled one or more authentication methods to access the account of the customer via the contact center or has disabled all access to the account of the customer via the contact center.

3. The computer-implemented method of claim 1, further comprising:
   receiving, by the computing system and from the user device, a request to review the account access settings for the account of the customer; and
   in response to the request, sending, by the computing system and to the user device, data representative of a user interface used to present the account access settings and receive the changes to the account access settings.

4. The computer-implemented method of claim 1, wherein providing the account access settings comprises receiving, by the computing system, a request to lookup the account access settings for the account of the customer from the one or more systems within the contact center based on one of the calls into the contact center that is attempting to access the account of the customer.

5. The computer-implemented method of claim 1, further comprising:
   receiving, by the computing system, an indication that at least one of the calls into the contact center comprises a potentially fraudulent access to the account of the customer; and
   in response to the indication, reporting the at least one of the calls to a fraud prevention system of the organization.

6. The computer-implemented method of claim 1, further comprising:
   generating, by the computing system, a call history for the customer, wherein the call history includes the one or more calls into the contact center that are associated with the account of the customer; and
   sending, by the computing system, data representative of the call history to the user device of the customer.

7. The computer-implemented method of claim 6, wherein the data representative of the call history comprises data representative of a user interface used to present an interactive call history that includes access information indicating how each of the one or more calls accessed the account of the customer via the contact center, and wherein at least a portion of the access information included in the interactive call history is linked to the account access settings for the account of the customer.

8. The computer-implemented method of claim 7, further comprising:
   receiving, by the computing system and from the user device, a selection of a linked portion of the access information included in the interactive call history; and in response to the selection, sending, by the computing system and to the user device, data representative of a user interface used to receive the changes to the account access settings associated with the linked portion of the access information.

9. The computer-implemented method of claim 6, wherein sending the data representative of the call history comprises sending a notification to the user device on a periodic basis, wherein the notification includes the data representative of the call history.

10. A computing system comprising:
one or more storage units configured to store a plurality of account access settings for a contact center of an organization; and
one or more processors in communication with the storage units and configured to:
receive, from a user device of a customer having an account at the organization, data representative of changes to account access settings that define restrictions on accessing the account of the customer via the contact center; and
provide, to one or more systems within the contact center, the account access settings for the account of the customer for use in determining whether to allow one or more calls into the contact center to access the account of the customer.

11. The computing system of claim 10, wherein the account access settings at least indicate whether the customer has disabled one or more authentication methods to access the account of the customer via the contact center or has disabled all access to the account of the customer via the contact center.

12. The computing system of claim 10, wherein the one or more processors are configured to:
receive, from the user device, a request to review the account access settings for the account of the customer; and
in response to the request, send, to the user device, data representative of a user interface used to present the account access settings and receive the changes to the account access settings.

13. The computing system of claim 10, wherein, to provide the account access settings, the one or more processors are further configured to receive a request to lookup the account access settings for the account of the customer from the one or more systems within the contact center based on one of the calls into the contact center that is attempting to access the account of the customer.

14. The computing system of claim 10, wherein the one or more processors are configured to:
receive an indication that at least one of the calls into the contact center comprises a potentially fraudulent access to the account of the customer; and
in response to the indication, report the at least one of the calls to a fraud prevention system of the organization.

15. The computing system of claim 10, wherein the one or more processors are configured to:
generate a call history for the customer, wherein the call history includes the one or more calls into the contact center that are associated with the account of the customer; and
send data representative of the call history to the user device of the customer.

16. The computing system of claim 15, wherein the data representative of the call history comprises data representative of a user interface used to present an interactive call history that includes access information indicating how each of the one or more calls accessed the account of the customer via the contact center, and wherein at least a portion of the access information included in the interactive call history is linked to the account access settings for the account of the customer.

17. The computing system of claim 16, wherein the one or more processors are configured to:
receive, from the user device, a selection of a linked portion of the access information included in the interactive call history; and
in response to the selection, send, to the user device, data representative of a user interface used to receive the changes to the account access settings associated with the linked portion of the access information.

18. A non-transitory computer readable medium including instructions that when executed cause one or more processors to:
receive, by a computing system of an organization and from a user device of a customer having an account at the organization, data representative of changes to account access settings that define restrictions on accessing the account of the customer via a contact center of the organization; and
provide, by the computing system and to one or more systems within the contact center, the account access settings for the account of the customer for use in determining whether to allow one or more calls into the contact center to access the account of the customer.

19. The non-transitory computer readable medium of claim 18, wherein the account access settings at least indicate whether the customer has disabled one or more authentication methods to access the account of the customer via the contact center or has disabled all access to the account of the customer via the contact center.

20. The non-transitory computer readable medium of claim 18, further comprising:
receiving, by the computing system and from the user device, a request to review the account access settings for the account of the customer; and
in response to the request, sending, by the computing system and to the user device, data representative of a user interface used to present the account access settings and receive the changes to the account access settings.

* * * * *